United States Patent
Menze (10) Patent No.: US 8,068,961 B2
(45) Date of Patent: Nov. 29, 2011

(54) SNOW PLOW POSITION-CONTROLLED VEHICLE HEADLIGHT OPERATION SYSTEM AND METHOD

(75) Inventor: William F. Menze, Escanaba, MI (US)

(73) Assignee: Sno-Way International, Inc., Hartford, WI (US)

( * ) Notice: Subject to any disclaimer, the term of this patent is extended or adjusted under 35 U.S.C. 154(b) by 754 days.

(21) Appl. No.: 12/140,509

(22) Filed: Jun. 17, 2008

(65) Prior Publication Data

US 2009/0312904 A1 Dec. 17, 2009

(51) Int. Cl.
- B60Q 1/04 (2006.01)
- B60Q 1/18 (2006.01)
- B60L 1/14 (2006.01)
- E01H 5/04 (2006.01)

(52) U.S. Cl. .............. 701/49; 315/83; 307/10.8; 37/234

(58) Field of Classification Search ............... 701/36, 701/49, 50, 1; 362/459, 464, 465, 485, 238, 362/466, 469, 467, 468, 487; 315/82, 83; 439/36; 307/10.8; 37/234
See application file for complete search history.

(56) References Cited

U.S. PATENT DOCUMENTS

| | | | |
|---|---|---|---|
| 4,280,062 A | | 7/1981 | Miller et al. |
| 5,361,519 A | * | 11/1994 | Ciula et al. .................... 37/234 |
| 5,420,480 A | * | 5/1995 | Knepel et al. .................. 315/82 |
| 6,005,300 A | | 12/1999 | Kelly |
| 6,163,985 A | * | 12/2000 | Chinnery et al. ............... 37/234 |
| 6,265,829 B1 | * | 7/2001 | Perdec ............................ 315/82 |
| 6,273,729 B1 | * | 8/2001 | Kelly ............................. 439/36 |
| 6,323,759 B1 | * | 11/2001 | Menze ....................... 340/425.5 |
| 6,396,210 B1 | * | 5/2002 | Menze ............................ 315/82 |
| 7,137,724 B2 | | 11/2006 | Menze et al. |
| 7,400,058 B1 | * | 7/2008 | Wayne et al. .................. 307/9.1 |
| 2004/0114378 A1 | * | 6/2004 | Nakamura et al. ............ 362/459 |
| 2006/0172558 A1 | | 8/2006 | Menze et al. |
| 2006/0172559 A1 | | 8/2006 | Menze et al. |
| 2007/0180739 A1 | * | 8/2007 | Potak ............................. 37/234 |
| 2008/0266888 A1 | * | 10/2008 | Wayne et al. ................. 362/487 |
| 2009/0312904 A1 | * | 12/2009 | Menze ............................ 701/36 |
| 2010/0217475 A1 | * | 8/2010 | Menze et al. ................... 701/29 |

* cited by examiner

Primary Examiner — Paul N Dickson
Assistant Examiner — Karen A Beck
(74) Attorney, Agent, or Firm — Reinhart Boerner Van Deuren s.c.

(57) ABSTRACT

A headlight control system for use on a snow plow mounted on the front of a vehicle and a related method are disclosed that automatically, selectively illuminate the headlights of the vehicle in addition to the headlights of the snow plow only when the snow plow blade is in a down position such that it is not physically obstructing the headlights of the vehicle. The headlight control system and method only operate to turn on the vehicle headlights when the snow plow lights are turned on. The headlight control system and method are capable of operating both the low beam headlights and the high beam headlights of the vehicle in conjunction with the low beam headlights and the high beam headlights of the snow plow when the snow plow blade is lowered.

14 Claims, 7 Drawing Sheets

SNOW PLOW POSITION-CONTROLLED VEHICLE HEADLIGHT OPERATION SYSTEM AND METHOD

BACKGROUND OF THE INVENTION

Field of the Invention

The present invention relates generally to auxiliary lighting systems such as those found on a snow plow mounted on the front of a vehicle, and more particularly to a system and method for automatically, selectively illuminates the headlights of the vehicle in addition to the headlights of the snow plow only when the snow plow blade is in a down position such that it is not physically obstructing the headlights of the vehicle.

Snow plows and like front-mounted vehicle accessories are mounted on vehicles such as pickup trucks or sport utility vehicles (SUV's) have been in use for some time, and such snow plows allow the quick and convenient plowing and removal of snow using the vehicle. Such snow plows and like front-mounted vehicle accessories are removable from the vehicle so that they need be attached to the vehicle only when needed (for snow plows, during the winter season when they will be used, with snow plows typically being removed from the vehicle for the balance of the year). Since such front-mounted vehicle accessories are mounted at the front of the vehicle in a position and at a level in front of the front end of the vehicle, they obstruct the lights of the vehicle, thereby necessitating the inclusion of lights on the vehicle accessory (for snow plows, in a position above the blade of the snow plow). It is particularly important to include headlights on such vehicle accessories which may be used at night (snow plows are frequently used in the early morning hours following a snow storm, well prior to sunrise).

Such front-mounted vehicle accessories typically have auxiliary headlights which are mounted on lighting bars located on the frames of the vehicle accessories. Since front-mounted vehicle accessories are mounted on vehicles in positions which obstruct the headlights of the vehicles, the headlights of vehicles having such vehicle accessories mounted thereon are typically disconnected. This is done for two reasons, the first of which is that since the headlights of a vehicle having a front-mounted vehicle accessory are obstructed by the vehicle accessory, and thus the headlights of the vehicle do not provide useful light and are redundant in view of the headlights mounted on the vehicle accessory. The second reason is that the simultaneous use of both headlights on a vehicle and headlights on a front-mounted vehicle accessory will require a high current drain which will have a number of adverse effect on the vehicle ranging from blowing the fuses on the headlights circuit to potentially and rapidly draining the battery and disabling the vehicle.

For this reason, lighting systems on front-mounted vehicle accessories are designed to allow the headlights of the vehicle to be disconnected and instead to operate the headlights of the vehicle accessory from the lighting system of the vehicle. Early examples of such lighting systems for use with snow plows are shown in U.S. Pat. No. 4,280,062, to Miller et al., and in U.S. Pat. No. 5,420,480, to Knepel et al., both of which are hereby incorporated herein by reference. The Miller et al. reference shows an auxiliary light wiring harness which plugs into the lighting system of the vehicle and provides a switch which allows an operator of the vehicle to select either the vehicle headlights or the snow plow headlights. This system of course has the substantial disadvantage of running extended lengths of wiring through which the electrical current operating the headlights must travel, potentially resulting in losses and diminished brightness from the headlights.

The Knepel et al. shows an automatic headlight switching system which utilizes relays to perform the function of switching between the vehicle headlights or the snow plow headlights. A connector is provided to connect the portion of the wiring harness of the headlight switching system in the vehicle to the portion of the wiring harness on the snow plow. The headlight system detects when the lighting harness of the snow plow is plugged into the wiring harness of the vehicle and actuates the relays to connect the headlights on the snow plow and to disconnect the headlights on the vehicle.

More recently, there have been several additional systems which may be used to interconnect the lighting system of a vehicle with the wiring system of a front-mounted vehicle accessory such as a snow plow. Examples of such systems are shown in U.S. Pat. No. 6,005,300, to Kelly, in U.S. Pat. No. 6,265,829, to Perdec, and in U.S. Pat. No. 6,396,210, to Menze, all of which are hereby incorporated herein by reference. The Kelly reference uses a lighting switch connected to an independent circuit to operate a control module which switches power between the vehicle headlights and the auxiliary headlights. The Perdec reference uses a microprocessor module which may be wirelessly controlled to control the operation of and switching between the vehicle headlights and the auxiliary headlights. The Menze reference discloses a headlight adapter system which uses modular wiring harnesses and connectors with a headlight selector switch to switch power between the vehicle headlights and auxiliary snow plow headlights.

All of these references have one thing in common in that each of them require a switching mechanism of some sort to switch between operation of the vehicle headlights and operation of the auxiliary headlights. The reason for the requirement of a switch is simple—each of these references adds a wiring harness which is permanently installed in the vehicle, and which plugs into a wiring harness located on the front-mounted vehicle accessory. Since it is a requirement that the vehicle headlights and the auxiliary headlights not be operated simultaneously, at least not with both at full intensity, in order to prevent excessive current drain, these previously known systems each require the use of a switch to select either the vehicle headlights or the auxiliary headlights.

Some major improvements to these systems were disclosed in U.S. Pat. No. 7,137,724, to Menze et al., U.S. patent application Ser. No. 11/146,985, to Menze et al., and U.S. patent application Ser. No. 11/341,144, to Menze et al., all of which are assigned to the assignee of the present patent application, and all of which are hereby incorporated herein by reference. These three references disclose auxiliary lighting systems for use with snow plows which facilitate the interconnection of such auxiliary lighting systems to the lighting system of a vehicle upon which the snow plow is mounted to provide power to and to control the auxiliary lights with the lighting system of the vehicle.

These independent lighting systems provide first and second harness portions for respective installation on the vehicle and the vehicle accessory, with the first harness portion having a first configuration when it is not connected to the second harness portion and a second configuration when it is connected to the second harness portion. The first configuration allows the headlights on the vehicle to operate, while the second configuration allows only the headlights on the vehicle accessory to operate, with changes between the first and second configurations being accomplished without the need for a switch or a relay. The '985 application and the '144 application disclose that the first harness portion may be of modular construction, with a main portion having a standard configuration and one or more auxiliary portions being used to adapt the main portion to any of a wide variety of vehicles.

The one thing that each of these references mentioned above have in common is that when the independent lighting systems of the snow plows are connected to the electrical system of the vehicle, the headlights of the independent lighting systems on the snow plows operate but the headlights of the vehicle are completely removed from the system. The fundamental reason for this is when the snow plow is in the up position, which it is in whenever the vehicle is not being used to plow snow, the headlights of the vehicle would be useless, since they would serve to illuminate only the back side of the snow plow blade. For this reason, every one of the systems described above entirely disable the lights of the vehicle when the snow plow is mounted on the vehicle.

While this is entirely appropriate for the time when the vehicle is not plowing snow, when the vehicle is plowing snow it must rely solely upon the headlights of the auxiliary lighting system of the snow plow. These auxiliary lighting system headlights, while generally adequate, are typically not as good as the headlights on the vehicle. In addition, since it is common for the vehicle to be plowing snow when it is dark and during winter storms, it will be appreciated that often visibility with only the auxiliary lighting system headlights is insufficient for good visibility, occasionally leading to inadvertently striking objects with the snow plow simply because they were not visible in the inadequate light from the auxiliary lighting system headlights.

It is accordingly the primary objective of the system and method disclosed herein to provide a headlight control system that automatically turns on the headlights of the vehicle that the snow plow is mounted on when the snow plow blade is lowered. It is a closely related objective of the snow plow position-controlled headlight system and method disclosed herein that it be absolutely incapable of turning on the vehicle headlights when the snow plow blade is not lowered, thereby preventing wasteful use of power. It is a further related objective of the snow plow position-controlled headlight system and method disclosed herein that it only operate to turn on the vehicle headlights when the snow plow lights are on.

It is another objective of the snow plow position-controlled headlight system and method disclosed herein that it is capable of operating both the low beam headlights and the high beam headlights of the vehicle in conjunction with the low beam headlights and the high beam headlights of the snow plow when the snow plow blade is lowered. It is yet another objective of the snow plow position-controlled headlight system disclosed herein that it be simple and easy to install on a snow plow. It is still another objective of the snow plow position-controlled headlight system and method disclosed herein that it be amenable to use with a wide variety of different snow plows, including those snow plows having in the independent lighting systems.

The snow plow position-controlled headlight system and method disclosed herein must also be of construction which is both durable and long lasting, and it should also require little or no maintenance to be provided by the user throughout its operating lifetime. In order to enhance the market appeal of the apparatus of the snow plow position-controlled headlight system and method disclosed herein, it should also be of inexpensive construction to thereby afford it the broadest possible market. Finally, it is also an objective that all of the aforesaid advantages and objectives the snow plow position-controlled headlight system and method be achieved without incurring any substantial relative disadvantage.

SUMMARY OF THE INVENTION

The disadvantages and limitations of the background art discussed above are overcome by the system and method disclosed herein. With this system and method, a headlight control system is used to operate the headlights of a vehicle having a snow plow blade mounted thereupon. The headlights of the vehicle, which are conventionally electrically disconnected when the snow plow is mounted on the vehicle, are automatically operated by the headlight control system to operate only when the snow plow blade is lowered and the headlights of the snow plow are turned on.

The snow plow position-controlled headlight system and method disclosed herein operates the headlight control system based upon the status of two inputs. The first of these inputs is the current status of the snow plow blade, i.e., whether or not it is lowered. This input is obtained from the hydraulic system that is used to operate the blade of the snow plow, i.e., raise and lower the blade, pivot the blade, adjust the angles of the blades in a V-plow, etc. Since the hydraulic system is electrically operated using hydraulic solenoid valves, the status of the snow plow blade can be determined by monitoring the electrical input to the hydraulic solenoid valve that is used to lower the snow plow blade.

The second of the two inputs to the headlight control system is obtained from the headlights of the snow plow. When the headlights on the snow plow have electrical power supplied to them to illuminate them, it is apparent that they have been turned on by the lighting system of the vehicle. By monitoring the status of the supply of electrical power to the headlights of the snow plow, it can be determined whether or not they are turned on. Accordingly, the status of whether or not electrical power is being supplied to the headlights of the snow plow can be used as indication of whether or not they are turned on.

The snow plow position-controlled headlight system and method disclosed herein accordingly uses these two inputs to control the operation of the headlights of the vehicle. If the first input indicates that the snow plow blade is in its lowered position, and the second input indicates that the headlights of the snow plow have been turned on, the headlight control system automatically operates to illuminate the headlights of the vehicle as well. If, on the other hand, either the snow plow blade is not in its lowered position, or the headlights of the snow plow have not been turned on, or both, the headlight control system will not illuminate the headlights of the vehicle.

The snow plow position-controlled headlight system and method disclosed herein is capable of operating with straight blade snow plows, V-blade snow plows, or straight blade plows having moveable wings, as well as with either snow plows having a ground-switching hydraulic system or snow plows having a high-switching hydraulic system. The snow plow position-controlled headlight system and method disclosed herein is also capable of controlling either or both of the low beam headlights and the high beam headlights of the vehicle, either independently or together. The snow plow position-controlled headlight system and method disclosed herein may be installed in the electrical and hydraulic systems of snow plows in such a manner so as to not affect the operation of the electrical and hydraulic systems in any way.

It may therefore be seen that the present invention teaches a headlight control system that automatically turns on the headlights of the vehicle that the snow plow is mounted on when the snow plow blade is lowered. The snow plow position-controlled headlight system and method disclosed herein is absolutely incapable of turning on the vehicle headlights when the snow plow blade is not lowered, thereby preventing wasteful use of power. The snow plow position-controlled headlight system and method disclosed herein only operates to turn on the vehicle headlights when the snow plow lights are on.

The snow plow position-controlled headlight system and method disclosed herein is capable of operating both the low beam headlights and the high beam headlights of the vehicle in conjunction with the low beam headlights and the high beam headlights of the snow plow when the snow plow blade is lowered. The snow plow position-controlled headlight system disclosed herein is simple and easy to install on a snow plow. The snow plow position-controlled headlight system and method disclosed herein is amenable to use with a wide variety of different snow plows, including those snow plows having in the independent lighting systems.

The snow plow position-controlled headlight system and method disclosed herein is of a construction which is both durable and long lasting, and which will require little or no maintenance to be provided by the user throughout its operating lifetime. The snow plow position-controlled headlight system disclosed herein is also of inexpensive construction to enhance its market appeal and to thereby afford it the broadest possible market. Finally, all of the aforesaid advantages and objectives of the snow plow position-controlled headlight system and method are achieved without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENTS

Figure 1:
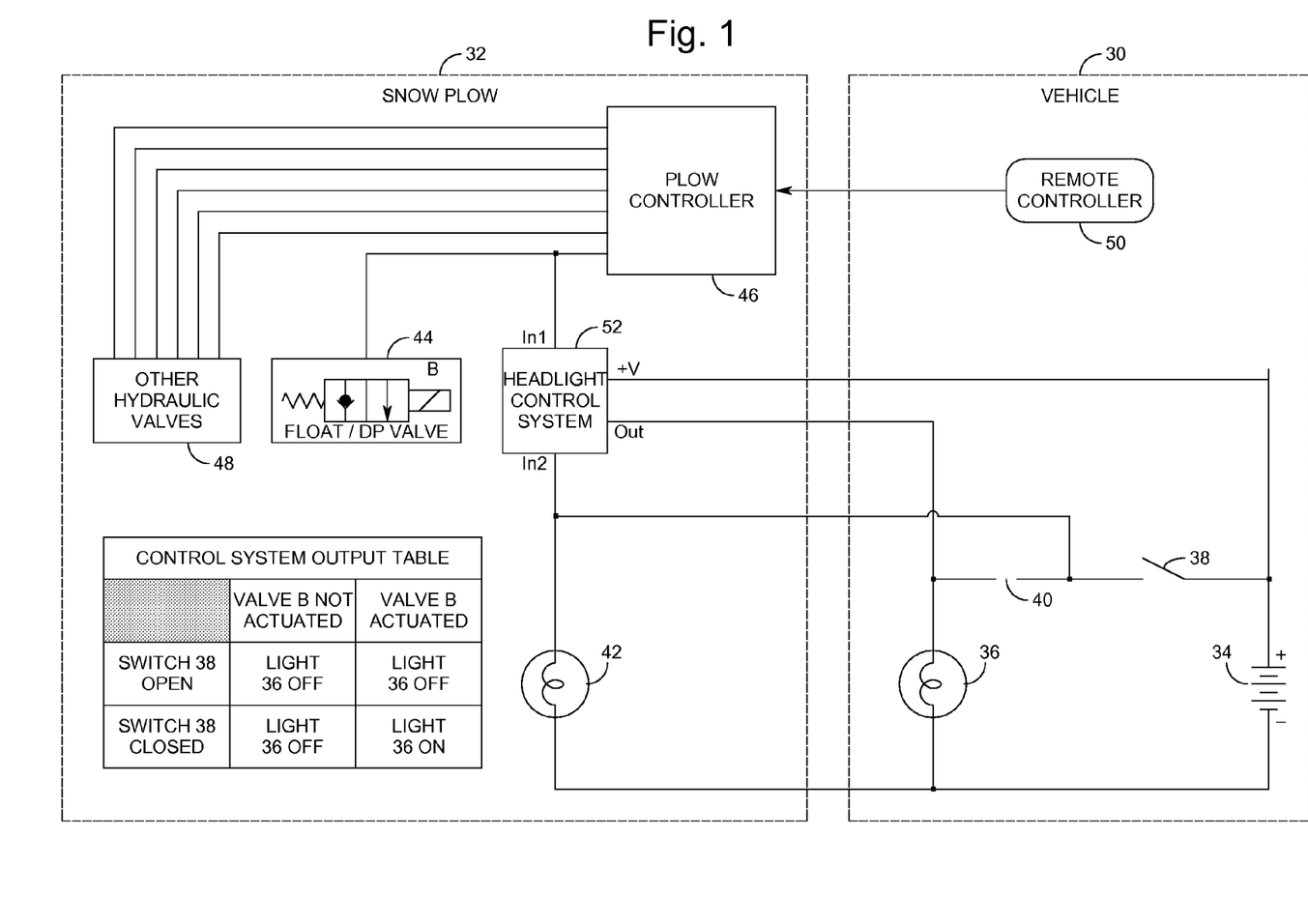
FIG. 1 is a schematic depiction of a portion of a conventional vehicle lighting system including a headlight, a vehicle battery, and a headlight switch to selectively actuate the headlight, and also showing a schematic depiction of a snow plow including portions of the hydraulic system and an auxiliary light connected to the vehicle lighting system, with the snow plow position-controlled headlight system and method disclosed herein to control the operation of the headlight of the vehicle.

An exemplary embodiment of the snow plow position-controlled headlight system and method disclosed herein is illustrated in FIG. 1, which shows portions of a vehicle 30 having a snow plow 32 mounted thereupon. The vehicle 30 has a battery 34 and a headlight 36, with a switch 38 that is used to operate the headlight 36 when the snow plow 32 in not being used with the vehicle 30. When the snow plow 32 is connected to the vehicle 30, the electrical connection between the switch 38 and the headlight 36 is opened, which is indicated by the reference numeral 40.

When the snow plow 32 is connected to the vehicle 30, a headlight 42 on the snow plow 32 will be operated by the switch 38 of the vehicle 30. Thus, as the switch 38 is switched "on" and "off," the headlight 42 on the snow plow 32 will be respectively illuminated and turned off, and the headlight 36 on the vehicle 30 will always remain off, since it is no longer electrically connected to the lighting system of the vehicle 30. It will be appreciated by those skilled in the art that, although only a single headlight 36 on the vehicle 30 and a single headlight 42 on the snow plow 32 are shown for purposes of simplicity, both vehicles and snow plows commonly have two low beam headlights and two high beam headlights.

Figure 7:
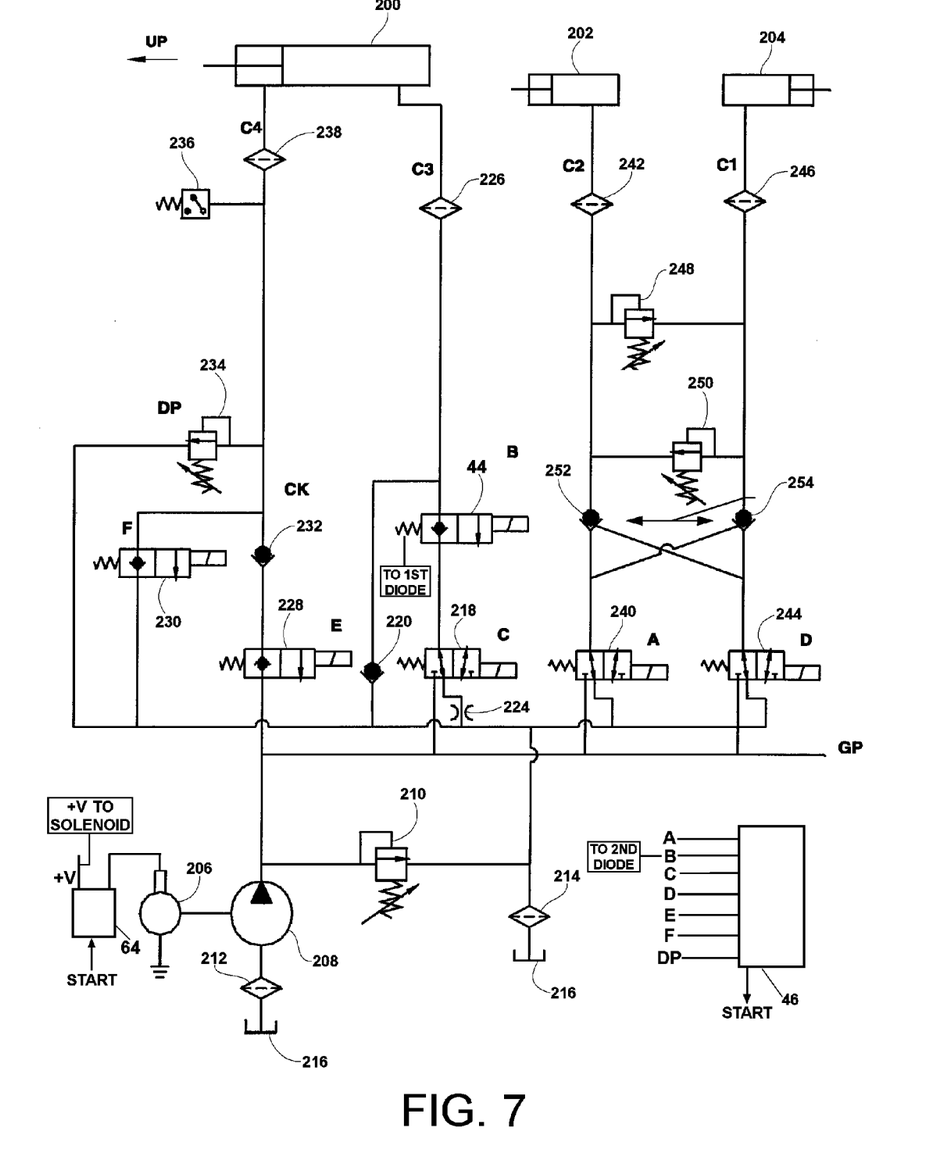
FIG. 7 is a hydraulic schematic diagram of a hydraulic system for a straight blade snow plow showing the electrical connections of the snow plow position-controlled headlight system illustrated in FIG. 4 thereto.

The snow plow 32, like most vehicle-installed snow plows, has a self-contained hydraulic system that is capably of at least raising and lowering the snow plow blade and orienting it in a desired orientation to control the displacement of snow by the snow plow blade. Hydraulically-controlled snow plows are operated by electric control systems that operate relays to operate hydraulic valves that control the flow of hydraulic fluid in the snow plow hydraulic system to operate the snow plow blade. (One such exemplary system for use with a straight blade snow plow is illustrated in FIG. 7.)

In FIG. 1, only one of these relay-operated hydraulic valves is shown in detail, namely a float/down pressure valve 44 that is electrically actuated by a plow controller 46, both of which are located on the snow plow 32. The plow controller 46 also electrically actuates other hydraulic valves, which are collectively identified by the reference numeral 48. The plow controller 46 is remotely controlled by a remote controller 50, which is located in the vehicle 30, and which may be connected to the plow controller 46 either with wires or wirelessly using radio frequency (RF) communication. Under the control of the remote controller 50, the plow controller 46 operates the float/down pressure valve 44 and the other hydraulic valves 48 to control the operation of the snow plow.

The snow plow position-controlled headlight system and method disclosed herein utilizes a headlight control system 52 that essentially has two inputs and controls the illumination of the headlight 36 to selectively supplement the illumination from the headlight 42. One of the two inputs to the headlight control system 52 is from the electrical signal from the plow controller 46 that is used to operate the float/down pressure valve 44. The float/down pressure valve 44 will be actuated by the plow controller 46 only upon the occurrence of at least one of two events.

The first event, which is present for any hydraulically-operated snow plow, is when the snow plow blade is lowered into its plowing position. The float/down pressure valve 44 is actuated by the plow controller 46 in order to cause the snow plow blade to be lowered, and will remain actuated by the plow controller 46 for so long as the snow plow blade is left in its downward position, which is referred to as the "float" position since the snow plow blade will follow the level of the ground upon which it rests, moving up and down in following the level of the ground. It is desirable to have the headlight 36 of the vehicle 30 "on" while the float/down pressure valve 44 is actuated and the snow plow blade is floating on the ground.

The other event, which is a patented function of snow plows having a DOWN PRESSURE system that are exclusively available from the assignee of the present patent application, is the application and maintenance of a downwardly-oriented pressure to the snow plow blade. (DOWN PRESSURE is a trademark owned by the assignee of the present patent application.) When this downwardly-oriented pressure is being applied to the snow plow blade, it is in its downward position, so it is again desirable to have the headlight 36 of the vehicle 30 "on" since the snow plow blade is being maintained on the ground. During the application of this downwardly-oriented pressure to the snow plow blade, the float/down pressure valve 44 is being actuated as is a down pressure valve (this is shown in FIG. 7).

Since the snow plow blade is in its lowered position while the float/down pressure valve 44 is being actuated by the plow controller 46, it may be seen that the signal from the plow controller 46 to the float/down pressure valve 44 may be used to indicate to the headlight control system 52 that the snow plow blade is in a lowered position.

Obviously, it is not desirable to illuminate the headlight 36 of the vehicle 30 when the headlight 42 of the snow plow 32 is not being illuminated. Accordingly, by monitoring when the headlight 42 of the snow plow 32 is being illuminated, the presence of a positive voltage being applied to the headlight 42 of the snow plow 32 can be used as an indication to the headlight control system 52 that the headlight 42 of the snow plow 32 is being illuminated by the switch 38.

The positive voltage from the battery 34 is also supplied to the headlight control system 52. By connecting this positive voltage to a wire connected to the headlight 36 of the vehicle 30, the headlight 36 of the vehicle 30 can be illuminated by the headlight control system 52. The logic used by the headlight control system 52 is illustrated by a control system output table that it also illustrated in FIG. 1. Whenever the float/down pressure valve 44 is being actuated by the plow controller 46 and the headlight 42 of the snow plow 32 is being illuminated by the switch 38, then, and only then, will the headlight control system 52 connect the positive voltage from the battery 34 to the headlight 36 of the vehicle 30 to illuminate it. Thus, it will be appreciated that the headlight 36 of the vehicle 30 will only be illuminated when the snow plow blade is in its lowered position and the headlight 42 is being illuminated.

The headlight control system 52 can have any of a number of different constructions. For example, the headlight control system 52 could be a solid state electronic device that controls a high power switching transistor (such as a MOSFET) to operate the headlight 36 of the snow plow 32 based upon the control system output table. Alternately, the headlight control system 52 may be one or a plurality of relays that are connected to operate according to the logic of control system output table.

Figure 2:
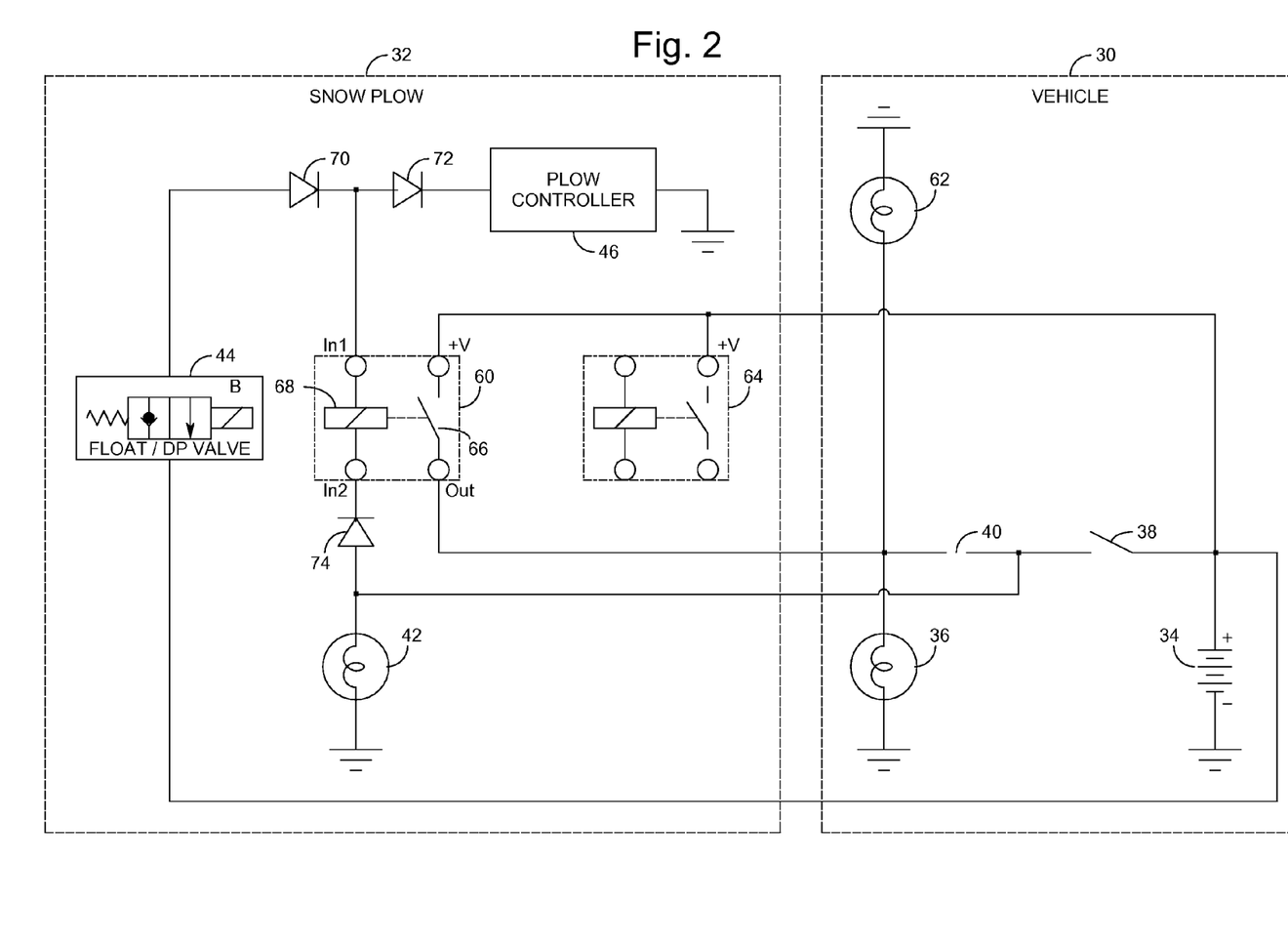
FIG. 2 is a schematic depiction similar to that shown in FIG. 1, but with an exemplary embodiment of the snow plow position-controlled headlight system and method disclosed herein shown in detail.

Referring next to FIG. 2, an implementation of the snow plow position-controlled headlight system disclosed herein is illustrated, with the components that are common to those illustrated in FIG. 1 being labeled with identical reference numerals. The other hydraulic valves 48 of the hydraulic system on the snow plow 32 and the remote controller 50 are not illustrated in FIG. 2, and it will be understood that their presence in FIG. 2 is unnecessary for the discussion of the snow plow position-controlled headlight system disclosed therein. The hydraulic system of the snow plow 32 that is illustrated in FIG. 2 is a ground-switching hydraulic system, meaning that the float/down pressure valve 44 is permanently connected to the positive side of the battery 34. As such, the plow controller 46 thus controls the connection of the float/down pressure valve 44 to ground in order to operate the float/down pressure valve 44. A ground-switching plow controller 46 is used by the assignee of the present patent application.

The headlight control system 52 shown in FIG. 1 is implemented in FIG. 2 as a high capacity relay 60 that switches the connection of the positive voltage from the battery 34 to an output terminal to operate the headlight 36, as well as a second headlight 62 located on the vehicle 30. Typically, the relay 60 obtains this positive battery voltage from the positive voltage terminal of a starter solenoid 64 that is used to operate a motor driving a hydraulic pump (not shown in FIG. 2) in the hydraulic system of the snow plow 32. (Other than as a source for the positive voltage from the battery 34, the starter solenoid 62 has no relevance to the snow plow position-controlled headlight system and method disclosed herein).

The relay 60 has a normally open switch 66 contained therein that is operated by a solenoid coil 68 also located therein. When the solenoid coil 68 is energized, it operates the switch 66, causing it to close and thereby supply positive voltage from the battery 34 to the headlights 36 and 62 on the vehicle 30. The principle that the relay 60 operates upon in the switched ground embodiment illustrated in FIG. 2 is that the solenoid coil 68 of the relay 60 is energized when its first input In1 is grounded and its second input In2 is connected to the positive voltage from the battery 34.

The first input In1 of the solenoid coil 68 of the relay 60 will be grounded when the plow controller 46 actuates the float/down pressure valve 44 by connecting it to ground. The second input In2 of the solenoid coil 68 of the relay 60 will be connected to positive voltage from the battery 34 when the switch 38 is closed to illuminate the headlight 42 in the snow plow 32. Thus, when the plow controller 46 actuates the float/down pressure valve 44 by connecting it to ground, and when the switch 38 is closed to illuminate the headlight 42 in the snow plow 32, the switch 66 closes and supplies positive voltage from the battery 34 to illuminate the headlights 36 and 62 on the vehicle 30.

In the preferred embodiment, diodes are used to isolate the relay 60 from both the hydraulic system and the headlight 42 of the snow plow 32. The anode of a diode 70 is connected to the float/down pressure valve 44, and the cathode of the diode 70 is connected to the anode of a diode 72, with the cathode of the diode 72 being connected to the plow controller 46. The first input In1 of the solenoid coil 68 of the relay 60 is connected to the cathode of the diode 70 and the anode of the diode 72. The anode of a diode 74 is connected to the side of the headlight 42 that is connected to the switch 38, and the cathode of the diode 74 is connected as the second IN2 of the solenoid coil 68 of the relay 60.

Thus, when the switch 38 is closed to illuminate the headlight 42 and the plow controller 46 actuates the float/down pressure valve 44 by connecting it to ground, current will flow through the solenoid coil 68 of the relay 60, closing the switch 66 of the relay 60 and illuminating the headlights 36 and 62. However, when either the switch 38 is open or the plow controller 46 is not connecting the float/down pressure valve 44 to ground, no current will flow through the solenoid coil 68 of the relay 60, and thus the headlights 36 and 62 will not be illuminated.

Figure 3:
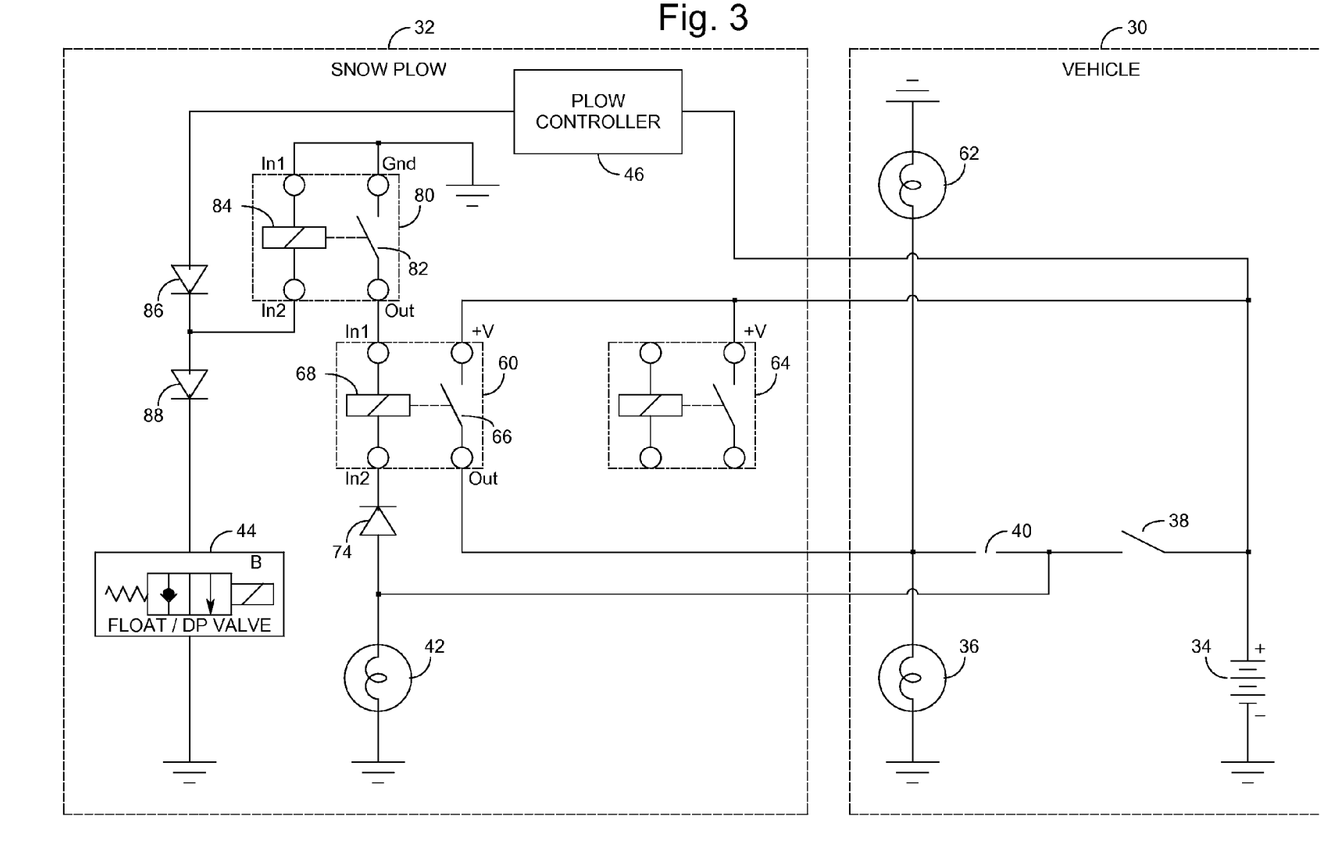
FIG. 3 is a is an alternate embodiment of the snow plow position-controlled headlight system and method disclosed herein shown in FIG. 2.

Referring next to FIG. 3, a snow plow position-controlled headlight system that is based upon a high-switching plow controller 46 is illustrated. As such, the float/down pressure valve 44 is permanently connected to ground, and the plow controller 46 thus controls the connection of the float/down pressure valve 44 to the positive side of the battery 34 in order to operate the float/down pressure valve 44. A high-switching plow controller 46 is somewhat more complex, inasmuch as it requires a second relay 80 in addition to the relay 60 to implement the headlight control system 52 (shown in FIG. 1).

The relay 80 also has a normally open switch 82 contained therein that is operated by a solenoid coil 84 also located therein. When the solenoid coil 84 is energized, it operates the switch 82, causing it to close and thereby ground its output, which is supplied as the first input In1 to the relay 60. Since the first input In1 of the relay 80 is grounded, the way that the relay 80 operates in the high-switched embodiment illustrated in FIG. 3 is that the solenoid coil 84 of the relay 80 is energized when its second input In2 is connected to the positive voltage from the battery 34. The principle that the combined relays 80 and 60 operate upon in the high-switched embodiment illustrated in FIG. 2 is that the solenoid coil 68 of the relay 60 is energized when the second input In2 of the relay 80 and the second input In2 of the relay 60 are both connected to the positive voltage from the battery 34.

The second input In2 of the solenoid coil 84 of the relay 80 will be connected to positive voltage from the battery 34 when the plow controller 46 actuates the float/down pressure valve 44 by connecting it to the positive voltage from the battery 34. The second input In2 of the solenoid coil 68 of the relay 60 will be connected to positive voltage from the battery 34 when the switch 38 is closed to illuminate the headlight 42 in the snow plow 32. Thus, when the plow controller 46 actuates the float/down pressure valve 44 by connecting it to positive voltage from the battery 34, and when the switch 38 is closed to illuminate the headlight 42 in the snow plow 32, the switch 66 closes and supplies positive voltage from the battery 34 to illuminate the headlight 36 and the headlight 62 in the vehicle 30.

In the embodiment shown in FIG. 3, diodes are again used to isolate the relay 80 from both the hydraulic system and the relay 60 from the headlight 42 of the snow plow 32. The diode 74 is connected as it is in FIG. 2, with its anode connected to the side of the headlight 42 that is connected to the switch 38, and its cathode connected as the second IN2 of the solenoid coil 68 of the relay 60. The anode of a diode 86 is connected to the plow controller 46, and the cathode of the diode 86 is connected to the anode of a diode 88, with the cathode of the diode 88 being connected to the float/down pressure valve 44. The second input In2 of the solenoid coil 84 of the relay 80 is connected to the cathode of the diode 86 and the anode of the diode 88.

Thus, when the switch 38 is closed to illuminate the headlight 42 and the plow controller 46 actuates the float/down pressure valve 44 by connecting it to positive voltage from the battery 34, current will flow through the solenoid coil 84 of the relay 80, closing the switch 82 of the relay 80 and energizing the solenoid coil 68 of the relay 60, closing the starter solenoid 64 of the relay 60 and illuminating the headlight 36 and the headlight 62. However, when either the switch 38 is open or the plow controller 46 is not connecting the float/down pressure valve 44 to positive voltage from the battery 34, no current will flow through the solenoid coil 68 of the relay 60, and thus the headlight 36 and the headlight 62 will not be illuminated.

Figure 4:
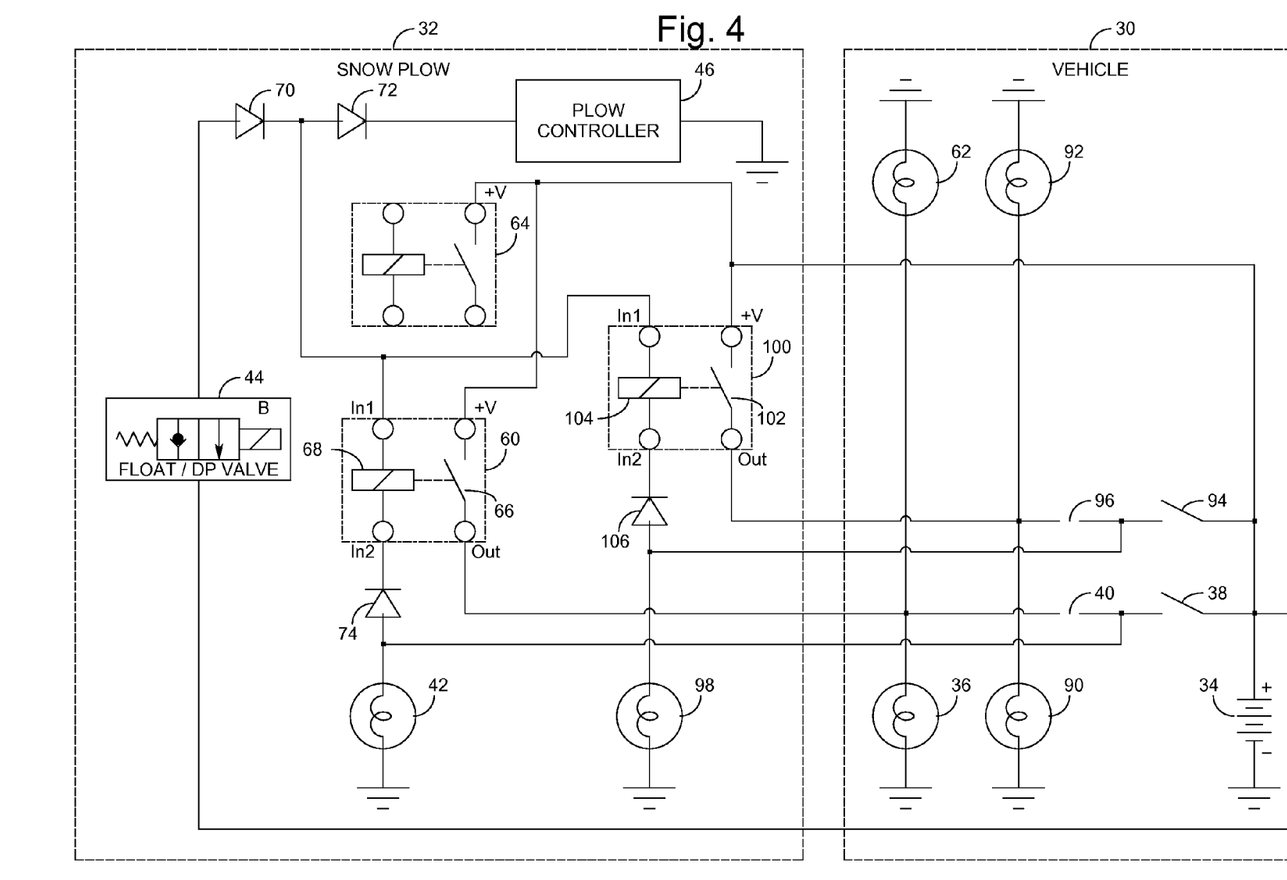
FIG. 4 is a schematic depiction similar to that shown in FIG. 1, but with another exemplary embodiment of the snow plow position-controlled headlight system and method disclosed herein that is capable of independently controlling both the low beam headlights of the vehicle and the high beam headlights of the vehicle.

Referring now to FIG. 4, a system similar to the one shown in FIG. 2 (having a ground-switching hydraulic system) is illustrated which has provision for operating both the low beam headlights and the high beam headlights of the vehicle 30, with the components that are common to those illustrated in FIG. 2 being labeled with identical reference numerals. It will be assumed that the headlight 36 and the headlight 62 are the low beam headlights of the vehicle 30. Also shown in FIG. 4 are two high beam headlights, namely a headlight 90 and a headlight 92, both of which are operated by a switch 94.

When the snow plow 32 is connected to the vehicle 30, the electrical connection between the switch 94 and the headlights 90 and 92 is opened, which is indicated by the reference numeral 96. When the snow plow 32 is connected to the vehicle 30, a high beam headlight 98 on the snow plow 32 will be operated by the switch 94 of the vehicle 30. Thus, as the switch 94 is switched "on" and "off," the headlight 98 on the snow plow 32 will be respectively illuminated and turned off. Although only a single high beam headlight 98 on the snow plow 32 is shown for purposes of simplicity, snow plows commonly have two high beam headlights.

The system illustrated in FIG. 4 uses a second high capacity relay 100 that switches the connection of the positive voltage from the battery 34 (which again may be obtained from the positive voltage terminal of the starter solenoid 64) to an output terminal to operate the headlights 90 and 92 of the vehicle 30. The second relay 100 has a normally open switch 102 contained therein that is operated by a solenoid coil 104 also located therein. When the solenoid coil 104 is energized, it operates the switch 102, causing it to close and thereby supply positive voltage from the battery 34 to the headlights 90 and 92 on the vehicle 30. The principle that the second relay 100 operates upon in the system illustrated in FIG. 4 is the same as in FIG. 2 for the relay 60, namely that the solenoid coil 104 of the second relay 100 is energized when its first input In1 is grounded and its second input In2 is connected to the positive voltage from the battery 34.

The second relay 100 is operated in the same manner as the relay 60 is operated. The first input In1 of the solenoid coil 104 of the second relay 100 will be grounded when the plow controller 46 actuates the float/down pressure valve 44 by connecting it to ground. The second input In2 of the solenoid coil 104 of the second relay 100 will be connected to positive voltage from the battery 34 when the switch 94 is closed to illuminate the headlight 98 on the snow plow 32. Thus, when the plow controller 46 actuates the float/down pressure valve 44 by connecting it to ground, and when the switch 38 is closed to illuminate the headlight 42 in the snow plow 32, the switch 102 closes and supplies positive voltage from the battery 34 to illuminate the high beam headlights 90 and 92 on the vehicle 30.

Once again, diodes are used to isolate the second relay 100 from both the hydraulic system and the high beam headlight 98 of the snow plow 32. For the connection to the hydraulic system of the snow plow 32 to supply its first input In1, the second relay 100 is connected to the cathode of the diode 70 and the anode of the diode 72. For the connection to the high beam headlight 98, the anode of a diode 106 is connected to the side of the headlight 98 that is connected to the switch 94, and the cathode of the diode 106 is connected as the second IN2 of the solenoid coil 104 of the second relay 100.

Thus, when the switch 94 is closed to illuminate the high beam headlight 98 and the plow controller 46 actuates the float/down pressure valve 44 by connecting it to ground, current will flow through the solenoid coil 104 of the relay second 100, closing the switch 102 of the second relay 100 and illuminating the high beam headlights 90 and 92. However, when either the switch 94 is open or the plow controller 46 is not connecting the float/down pressure valve 44 to ground, no current will flow through the solenoid coil 104 of the second relay 100, and thus the high beam headlights 90 and 92 will not be illuminated.

The snow plow position-controlled headlight system and method disclosed herein may be implemented in a wide variety of different snow plows, including in the independent lighting systems described in the above incorporated by reference U.S. Pat. No. 7,137,724 and U.S. patent application Ser. Nos. 11/146,985 and 11/341,144. Two such examples of the integration of the snow plow position-controlled headlight system and method disclosed herein into the independent lighting systems described in U.S. Pat. No. 7,137,724 and U.S. patent application Ser. No. 11/146,985 will be discussed herein in conjunction with FIGS. 5 and 6, respectively, to show the connections of the snow plow position-controlled headlight system and method to the headlights of a vehicle. Further, an example of a hydraulic system is provided in FIG. 7 to show the components of a typical hydraulic system.

First Exemplary Independent Lighting System Connection

Figure 5:
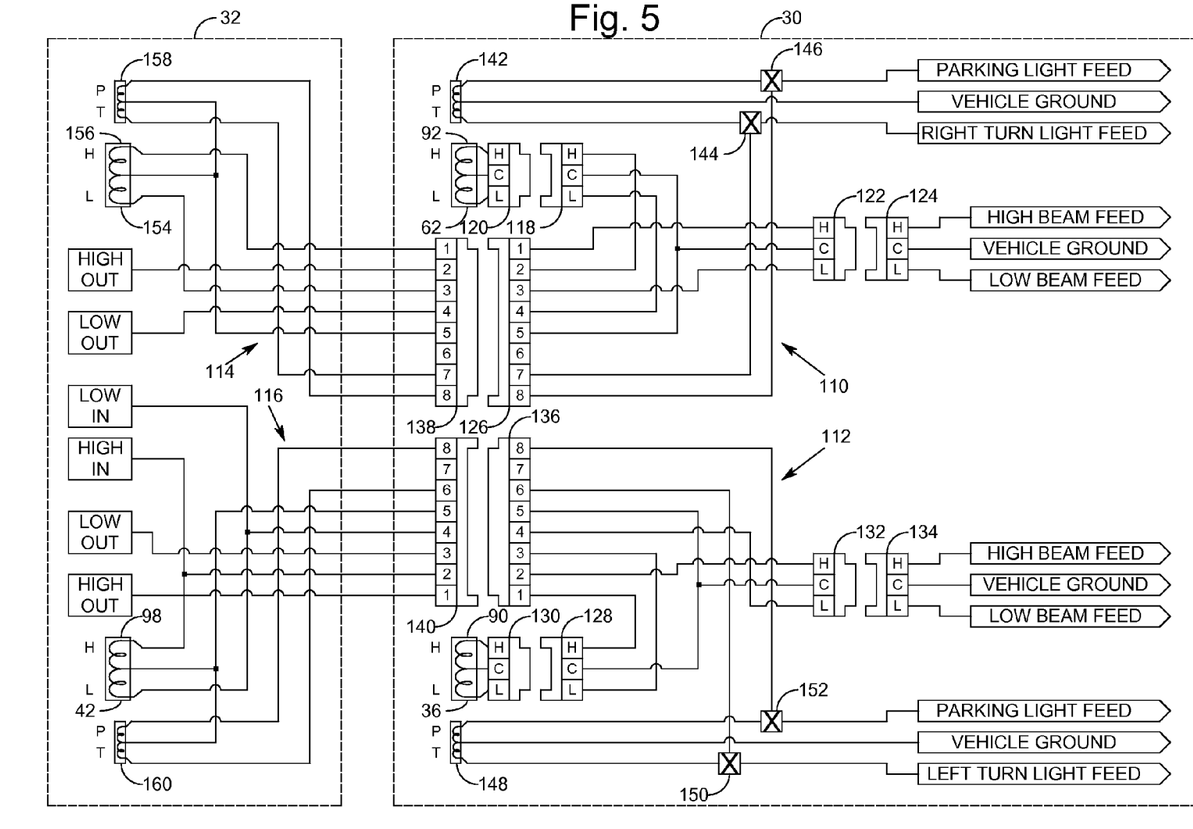
FIG. 5 is a schematic depiction of a first embodiment of an independent lighting system with the snow plow lights connected to the vehicle lighting system, showing the electrical connections of the snow plow position-controlled headlight system illustrated in FIG. 4 thereto.

Referring first then to FIG. 5, a schematic depiction of an independent lighting system which is constructed to connect and operate the auxiliary lights located on the snow plow the snow plow 32 is illustrated with the snow plow lights connected to the vehicle lighting system. A first harness portion is located on the vehicle 30, and a second harness portion is located on the snow plow 32. The first harness portion consists of a right side first harness portion 110 and a left side first harness portion 112, and the second harness portion consists of a right side second harness portion 114 and a left side second harness portion 116.

The right side first harness portion 110 includes a headlight connector 118 which is connected to a connector element 120 of a headlight having the low beam headlight 62 and the high beam headlight 92, a headlight power connector 122 which is connected to a headlight plug 124, and a right side first harness connector 126. The left side first harness portion 112 includes a headlight connector 128 which is connected to a connector element 130 of a headlight having the low beam headlight 36 and the high beam headlight 90, a headlight power connector 132 which is connected to a headlight plug 134, and a left side first harness connector 136.

The right side second harness portion 114 has a right side second harness connector 138, and the left side second harness portion 116 has a left side second harness connector 140. The right side first harness connector 126 will mate with the left side first harness connector 136 or with the right side second harness connector 138, but not with the left side second harness connector 140. The left side first harness connector 136 will mate with the right side first harness connector 126 or with the left side second harness connector 140, but not with the right side second harness connector 138. The right side second harness connector 138 and the left side second harness connector 140 will also mate with each other. The right side first harness connector 126 and the left side second harness connector 140 are female connectors, and the left side first harness connector 136 and the right side second harness connector 138 are male connectors, but this configuration could be reversed.

The right side first harness connector 126, the left side first harness connector 136, the right side second harness connector 138, and the left side second harness connector 140 are all eight-pin connectors. With regard to the right side first harness connector 126, pins 1 and 3 are respectively connected to the headlight power connector 122 as the high beam feed and the low beam feed. Pins 2 and 4 of the right side first harness connector 126 are respectively connected to the headlight connector 118 as the high beam lead and the low beam lead. Pin 5 of the right side first harness connector 126 is connected to both the headlight connector 118 as the common (ground) lead and to the headlight power connector 122 as the vehicle ground. Pin 7 of the right side first harness connector 126 is connected to the right turn signal feed for a right parking/turn light 142 using a right turn signal feed tap 144, and pin 8 of the right side first harness connector 126 is connected to the parking light feed using a parking light feed tap 146.

With regard to the left side first harness connector 136, pins 1 and 3 are respectively connected to the headlight connector 128 as the high beam lead and the low beam lead. Pins 2 and 4 of the left side first harness connector 136 are respectively connected to the headlight power connector 132 as the high beam feed and the low beam feed. Pin 5 of the left side first harness connector 136 is connected to both the headlight connector 128 as the common (ground) lead and to the headlight power connector 132 as the vehicle ground. Pin 6 of the left side first harness connector 136 is connected to the left turn signal feed a left parking/turn light 148 using a left turn signal feed tap 150, and pin 8 of the left side first harness connector 136 is connected to the parking light feed using a parking light feed tap 152.

With regard to the right side second harness connector 138, pin 1 is connected to the high beam headlight 154, pin 3 is connected to the low beam headlight 156, pin 5 is connected to the common (ground) leads of both the headlights 154 and 156 and to a parking/turn light 158, pin 7 is connected to the right turn signal lead of the parking/turn light 158, and pin 8 is connected to the parking light feed of the parking/turn light 158. With regard to the left side second harness connector 140, pin 2 is connected to the high beam headlight 98, pin 4 is connected to the low beam headlight 54, pin 5 is connected to the common (ground) leads of both the low beam headlight 42 and the high beam headlight 98 and to a parking/turn light 160, pin 6 is connected to the left turn signal lead of the parking/turn light 160, and pin 8 is connected to the parking light feed of the parking/turn light 160.

The independent lighting system illustrated in FIG. 5 switches only the hot leads from the headlights of the vehicle 30 to the headlights of the snow plow 32. When the right side first harness connector 126 and the left side first harness connector 136 are connected together, the headlights of the vehicle 30 will be operative. If the right side first harness connector 126 and the left side first harness connector 136 are not connected to each other, the headlights of the vehicle 30 will be inoperative without the snow plow position-controlled headlight system and method disclosed herein.

When the right side first harness connector 126 is connected to the right side second harness connector 138 and the left side first harness connector 136 is connected to the left side second harness connector 140, the headlights of the snow plow 32 will be operative, and the headlights of the vehicle 30 will not be operative without the snow plow position-controlled headlight system and method disclosed herein.

The connections to and from the independent lighting system illustrated in FIG. 5 may now be discussed in conjunction with FIG. 4. The second input In2 to the relay 60 (FIG. 4) may be taken from Pin 4 of the left side second harness connector 140, which is labeled "LOW IN" in FIG. 5 (or, alternately, it could instead be taken from Pin 3 of the right side second harness connector 138). The second input In2 to the second relay 100 (FIG. 4) may be taken from Pin 2 of the left side second harness connector 140, which is labeled "HIGH IN" in FIG. 5 (or, alternately, it could instead be taken from Pin 1 of the right side second harness connector 138).

The output Out from the relay 60 (FIG. 4) may be provided to Pin 4 of the right side second harness connector 138 and to Pin 3 of the left side second harness connector 140, both of which are labeled "LOW OUT" in FIG. 5. The output Out from the second relay 100 (FIG. 4) may be provided to Pin 2 of the right side second harness connector 138 and to Pin 2 of the left side second harness connector 140, both of which are labeled "HIGH OUT" in FIG. 5.

Second Exemplary Independent Lighting System Connection

Figure 6:
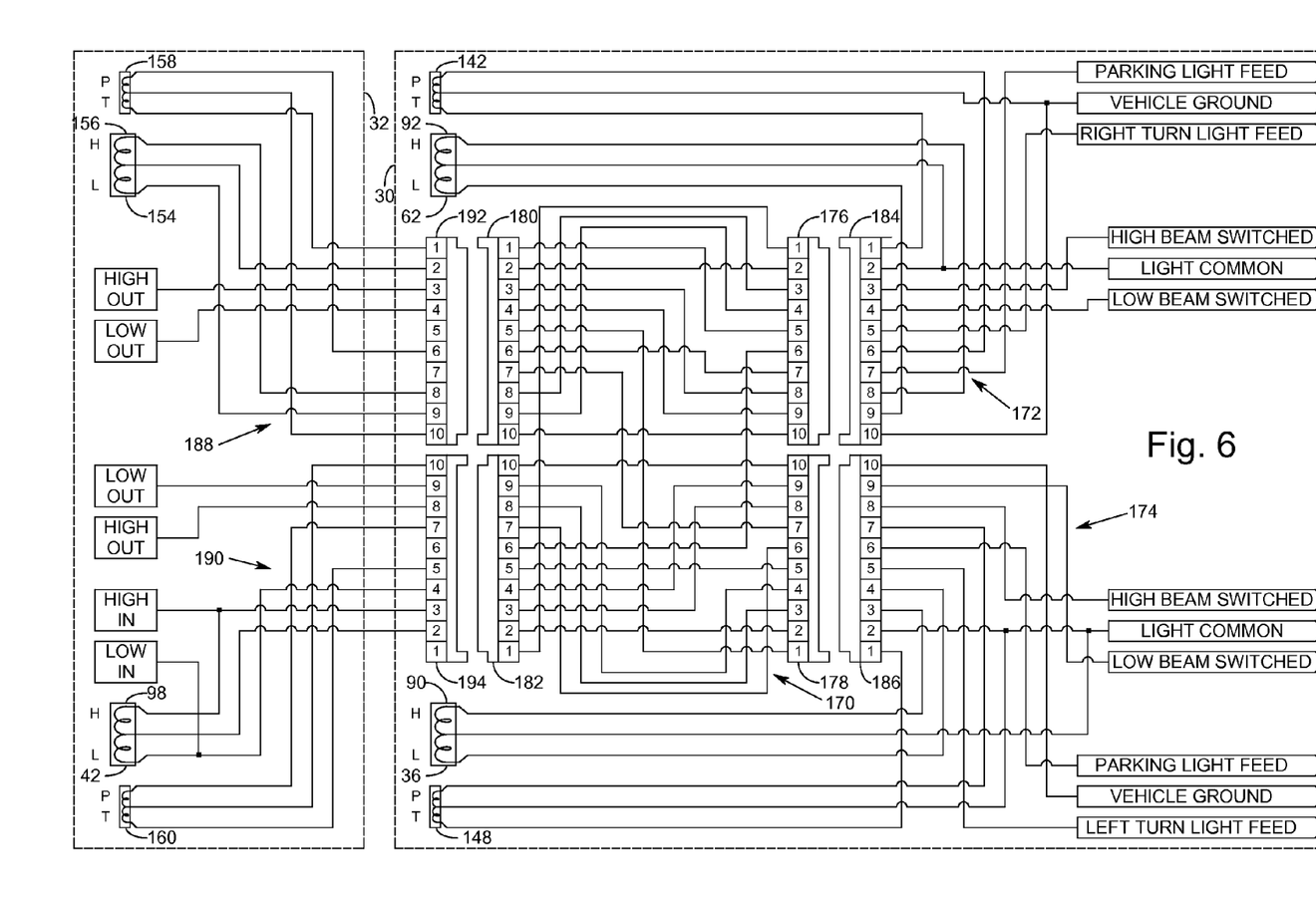
FIG. 6 is a schematic depiction of a second embodiment of an independent lighting system with the snow plow lights connected to the vehicle lighting system, showing the electrical connections of the snow plow position-controlled headlight system illustrated in FIG. 4 thereto.

Referring next to FIG. 6, a schematic depiction of another independent lighting system which is constructed to connect and operate the auxiliary lights located on the snow plow the snow plow 32 is illustrated with the snow plow lights connected to the vehicle lighting system. This embodiment is suitable for use with a vehicle in which all of the electrical connections of the independent lighting system are to be made by cutting and splicing wires. The portion of the independent lighting system which is located on the vehicle consists of a main vehicle harness portion 170, a right side auxiliary harness portion 172, and a left side auxiliary harness portion 174.

The main vehicle harness portion 170 has a right side portion which is connected to the electrical system of the vehicle 30 with a right side main harness connector 176, and a left side portion which is connected to the electrical system of the vehicle with a left side main harness connector 178. The right side portion of the main vehicle harness portion 170 connected to the snow plow 32 with a right side vehicle harness connector 180, and the left side of the main vehicle harness portion 170 is likewise connected to the snow plow 32 with a left side vehicle harness connector 182.

The right side auxiliary harness portion 172 has a right side auxiliary harness connector 184 to connect it to the right side main harness connector 176 of the main vehicle harness portion 170. The left side auxiliary harness portion 174 has a left side auxiliary harness connector 186 to connect it to the left side main harness connector 178 of the main vehicle harness portion 170.

The portion of the independent lighting system located on the snow plow 32 includes a right side accessory harness 188 and a left side accessory harness 190. The right side accessory harness 188 has a right side accessory connector 192 and the left side accessory harness 190 has a left side accessory connector 194.

The right side vehicle harness connector 180 will mate with the left side vehicle harness connector 182 or with the right side accessory connector 192, but not with the left side accessory connector 194. The left side vehicle harness connector 182 will mate with the right side vehicle harness connector 180 or with the left side accessory connector 194, but not with the right side accessory connector 192. The right side accessory connector 192 and the left side accessory connector 194 will also mate with each other. In FIG. 6, the right side vehicle harness connector 180 and the left side accessory connector 194 are female connectors, and the left side vehicle harness connector 182 and the right side accessory connector 192 are male connectors, but this configuration could be reversed.

The right side vehicle harness connector 180, the left side vehicle harness connector 182, the right side auxiliary harness connector 184, and the left side auxiliary harness connector 186 are all ten-pin connectors. Pins 1, 2, 3, 4, 6, 8, 9, and 10 of the right side vehicle harness connector 180 are respectively connected to pins 5, 2, 8, 9, 7, 3, 4, and 10 of the right side main harness connector 176. Pins 2, 3, 4, 5, 7, 8, 9, and 10 of the left side vehicle harness connector 182 are respectively connected to pins 2, 8, 9, 5, 6, 3, 4, and 10 of the left side main harness connector 178.

In addition, there are four connections between the right and left halves of the right side vehicle harness connector 180. Pins 5 and 7 of the right side vehicle harness connector 180 are respectively connected to pins 1 and 7 of the left side main harness connector 178. Pins 1 and 6 of the left side vehicle harness connector 182 are respectively connected to pins 1 and 6 of the right side main harness connector 176.

The right side main harness connector 176 will mate with the right side auxiliary harness connector 184, but not with the left side auxiliary harness connector 186. The left side main harness connector 178 will mate with the left side auxiliary harness connector 186, but not with the right side auxiliary harness connector 184. The left side main harness connector 178 and the right side auxiliary harness connector 184 are female connectors, and the right side main harness connector 176 and the left side auxiliary harness connector 186 are male connectors, but this configuration could be reversed. The right side main harness connector 176, the left side main harness connector 178, the right side auxiliary harness connector 184, and the left side auxiliary harness connector 186 are all ten-pin connectors.

The right side auxiliary harness portion 172 and the left side auxiliary harness portion 174 are hard-wired embodiments in which the wires of the right side auxiliary harness portion 172 and the left side auxiliary harness portion 174 are directly connected to the vehicle lighting electrical wiring.

Referring first to the right side vehicle lighting electrical wiring, it may be seen that the electrical connection between the high beam switched feed and the high beam headlight 92 is cut, and the electrical connection between the low beam switched feed and the low beam headlight 62 is cut. Likewise, the electrical connection between the parking light feed and the parking light lead to the parking/turn light 142 is cut, and the electrical connection between the right turn light feed and the right turn light lead to the parking/turn light 42 is cut. However, the electrical connection between the light common feed and the light common lead to the headlights 62 and 92 is not cut, and the electrical connection between the vehicle ground feed and the vehicle ground lead to the parking/turn light 142 is not cut.

Pins 3 and 4 of the right side auxiliary harness connector 184 are respectively connected to the high beam switched feed and the low beam switched feed. Pins 8 and 9 of the right side auxiliary harness connector 184 are respectively connected to the high beam headlight 92 and the low beam headlight 62. Pin 2 of the right side auxiliary harness connector 184 is connected to the light common lead.

Pins 7 and 5 of the right side auxiliary harness connector 184 are respectively connected to the parking light feed and the right turn signal feed. Pins 6 and 1 of the right side auxiliary harness connector 184 are respectively connected to the parking light lead of the parking/turn light 142 and the right turn signal lead of the parking/turn light 142. Pin 10 of the right side auxiliary harness connector 184 is connected to the vehicle ground lead.

Referring now to the left side vehicle lighting electrical wiring, it may be seen that the electrical connection between the high beam switched feed and the high beam headlight 90 is cut, and the electrical connection between the low beam switched feed and the low beam headlight 36 is cut. Likewise, the electrical connection between the parking light feed and the parking light lead to the parking/turn light 148 is cut, and the electrical connection between the right turn light feed and the right turn light lead to the parking/turn light 148 is cut. However, the electrical connection between the light common feed and the light common lead to the headlights 36 and 90 is not cut, and the electrical connection between the vehicle ground feed and the vehicle ground lead to the parking/turn light 148 is not cut.

Pins 8 and 9 of the left side auxiliary harness connector 186 are respectively connected to the high beam switched feed and the low beam switched feed. Pins 3 and 4 of the left side auxiliary harness connector 186 are respectively connected to the high beam headlight 90 and the low beam headlight 36. Pin 2 of the left side auxiliary harness connector 186 is connected to the light common lead.

Pins 6 and 5 of the left side auxiliary harness connector 186 are respectively connected to the parking light feed and the left turn signal feed. Pins 7 and 1 of the left side auxiliary harness connector 186 are respectively connected to the parking light lead of the parking/turn light 148 and the left turn signal lead of the parking/turn light 148. Pin 10 of the left side auxiliary harness connector 186 is connected to the vehicle ground lead.

With regard to the right side accessory harness 188, Pin 1 is connected to the right turn signal lead of the parking/turn light 158, Pin 2 is connected to the common lead of the headlights 154 and 156, Pin 6 is connected to the parking light feed of the parking/turn light 158, Pin 8 is connected to the high beam headlight 156, Pin 9 is connected to the low beam headlight 154, and Pin 10 is connected to the ground lead of the parking/turn light 158. With regard to the left side accessory harness 190, Pin 2 is connected to the common lead of the headlights 42 and 98, Pin 3 is connected to the high beam headlight 98, Pin 4 is connected to the low beam headlight 42, Pin 5 is connected to the left turn signal lead of the parking/turn light 160, Pin 7 is connected to the parking light feed of the parking/turn light 160, and Pin 10 is connected to the ground lead of the parking/turn light 160.

The independent lighting system illustrated in FIG. 6 switches the hot leads from the headlights of the vehicle 30 to the headlights of the snow plow 32. It also switches the hot leads from the parking lights and turn signals of the vehicle 30 to the parking lights and turn signals of the snow plow 32. When the right side vehicle harness connector 180 and the left side vehicle harness connector 182 of the right side vehicle harness connector 180 are connected together, the headlights and the parking lights and turn signals of the vehicle 30 will be operative. If the right side vehicle harness connector 180 and the left side vehicle harness connector 182 are not connected to each other, the headlights and the parking lights and turn signals of the vehicle 30 will be inoperative without the snow plow position-controlled headlight system and method disclosed herein.

When the right side vehicle harness connector 180 is connected to the right side accessory connector 192 and the left side vehicle harness connector 182 is connected to the left side accessory connector 194, the headlights and the parking lights and turn signals of the snow plow 32 will be operative, and the headlights and the parking lights and turn signals of the vehicle 30 will not be operative without the snow plow position-controlled headlight system and method disclosed herein.

The connections to and from the independent lighting system illustrated in FIG. 6 may now be discussed in conjunction with FIG. 4. The second input In2 to the relay 60 (FIG. 4) may be taken from Pin 4 of the left side accessory connector 194, which is labeled "LOW IN" in FIG. 6 (or, alternately, it could instead be taken from Pin 9 of the right side accessory connector 192). The second input In2 to the second relay 100 (FIG. 4) may be taken from Pin 3 of the left side accessory connector 194, which is labeled "HIGH IN" in FIG. 6 (or, alternately, it could instead be taken from Pin 8 of the right side accessory connector 192).

The output Out from the relay 60 (FIG. 4) may be provided to Pin 4 of the right side accessory connector 192 and to Pin 9 of the left side accessory connector 194, both of which are labeled "LOW OUT" in FIG. 6. The output Out from the second relay 100 (FIG. 4) may be provided to Pin 3 of the right side accessory connector 192 and to Pin 8 of the left side accessory connector 194, both of which are labeled "HIGH OUT" in FIG. 6.

Exemplary Hydraulic System Connection

Referring finally to FIG. 7, an exemplary hydraulic system that may be operated by the plow controller 46 (shown in FIG. 4) for actuating a straight blade snow plow is illustrated. The straight blade snow plow is represented by three hydraulic cylinders, namely a double acting raise cylinder 200, a single acting left pivot cylinder 202, and a single acting right pivot cylinder 204. The hydraulic system operates with an electric motor 206 that is actuated by the start solenoid 64, which is actuated by the plow controller 46. The electric motor 206 operating a hydraulic pump 208 that provides hydraulic fluid under pressure and including a system relief valve 210 to control pressure in the hydraulic system. Also included in the hydraulic fluid supply and system relief circuit are two filters 212 and 214 and a hydraulic fluid reservoir 216.

Hydraulic operation of the raise cylinder 200 has two fluid paths, the first of which raises the straight plow and includes a raise valve 218, the float/down pressure valve 44, and a check valve 220. Also included in the first fluid path is a flow restrictor 224 and a filter 226. The second fluid path which lowers the straight plow and maintains a downwardly-oriented pressure on the snow plow blade includes a down pressure valve 228, a raise/float valve 230, a check valve 232, and a down pressure relief valve 234. Also included in the second fluid path is a down pressure switch 236 (which is used to detect the existence of downward pressure on the snow plow blade) and a filter 238.

Hydraulic operation of the single acting left pivot cylinder 202 is via a right angle valve 240 and a filter 242. Hydraulic operation of the single acting right pivot cylinder 204 is via a left angle valve 244 and a filter 246. There are two crossover relief valves 248 and 250 and two pilot operated check valves 252 and 254 that are connected between the lines to the single acting left pivot cylinder 202 and the single acting right cylinder 204.

The connections to and from the hydraulic system illustrated in FIG. 7 may now be discussed in conjunction with FIG. 4. The cathode of the diode 72 (FIG. 4) is connected to the output B from the plow controller 46 labeled "TO 2ND DIODE" in FIG. 7, and the anode of the diode 70 (FIG. 4) is connected to the input to the float/down pressure valve 44 labeled "TO 1ST DIODE" in FIG. 7. The relay 60 (FIG. 4) and the second relay 100 (FIG. 4) obtain the positive voltage from the battery 34 from the starter solenoid 64 labeled "+V TO SOLENOID" in FIG. 7.

It may therefore be appreciated from the above detailed description of the exemplary embodiments of the present invention that it teaches a headlight control system that automatically turns on the headlights of the vehicle that the snow plow is mounted on when the snow plow blade is lowered. The snow plow position-controlled headlight system and method disclosed herein is absolutely incapable of turning on the vehicle headlights when the snow plow blade is not lowered, thereby preventing wasteful use of power. The snow plow position-controlled headlight system and method disclosed herein only operates to turn on the vehicle headlights when the snow plow lights are on.

The snow plow position-controlled headlight system and method disclosed herein is capable of operating both the low beam headlights and the high beam headlights of the vehicle in conjunction with the low beam headlights and the high beam headlights of the snow plow when the snow plow blade is lowered. The snow plow position-controlled headlight system disclosed herein is simple and easy to install on a snow plow. The snow plow position-controlled headlight system and method disclosed herein is amenable to use with a wide variety of different snow plows, including those snow plows having in the independent lighting systems.

The snow plow position-controlled headlight system and method disclosed herein is of a construction which is both durable and long lasting, and which will require little or no maintenance to be provided by the user throughout its operating lifetime. The snow plow position-controlled headlight system disclosed herein is also of inexpensive construction to enhance its market appeal and to thereby afford it the broadest possible market. Finally, all of the aforesaid advantages and objectives of the snow plow position-controlled headlight system and method are achieved without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A headlight control system for controlling a first headlight of a vehicle having its lighting system connected to a first headlight on a snow plow having a snow plow blade, the first headlight of the vehicle being disconnected when the first headlight of the snow plow is connected to be operated by the lighting system of the vehicle, said headlight control system comprising:
   a blade position monitor which determines whether or not the snow plow blade is in a lowered position;
   a first headlight power sensor which senses whether or not the first headlight of the snow plow is being provided with power by the lighting system of the vehicle to illuminate the first headlight of the snow plow;
   a first vehicle headlight controller which automatically illuminates the first headlight of the vehicle when and only when the blade of the snow plow has been determined to be in a lowered position and electrical power is supplied to the first headlight of the snow plow by the lighting system of the vehicle to illuminate the first headlight of the snow plow, wherein the snow plow blade is operated by a hydraulic system having an electrically-operated hydraulic valve for lowering the snow plow blade which is controlled by an electrical signal supplied by a plow controller to the electrically-operated hydraulic valve on an electrical connection between the plow controller and the electrically-operated hydraulic valve for lowering the snow plow blade, and wherein said blade position monitor comprises:
   an electrical connection between said first vehicle headlight controller and the electrical connection between the plow controller and the electrically-operated hydraulic valve for lowering the snow plow blade, wherein the plow controller is a ground-switching plow controller that electrically connects the electrical connection between the plow controller and the electrically-operated hydraulic valve for lowering the snow plow blade to electrical ground to cause the electrically-operated hydraulic valve for lowering the snow plow blade to lower the snow plow blade;
   a first diode having an anode electrically connected to the electrically-operated hydraulic valve for lowering the snow plow blade, said first diode also having a cathode; and
   a second diode having an anode that is electrically connected to said cathode of said first diode and a cathode that is electrically connected to said plow controller;
   wherein said first vehicle headlight controller is connected to said cathode of said first diode and said anode of said second diode, isolating said first vehicle headlight controller from the plow controller and the electrically-operated hydraulic valve for lowering the snow plow blade.

2. A headlight control system as defined in claim 1, wherein the plow controller is a high-switching plow controller that electrically connects the electrical connection between the plow controller and the electrically-operated hydraulic valve for lowering the snow plow blade to a voltage source to cause the electrically-operated hydraulic valve for lowering the snow plow blade to lower the snow plow blade.

3. A headlight control system as defined in claim 2, additionally comprising:
   means for isolating said first vehicle headlight controller from the plow controller and the electrically-operated hydraulic valve for lowering the snow plow blade.

4. A headlight control system as defined in claim 3 wherein said isolating means comprises:
   a first diode having an anode electrically connected to said plow controller, said first diode also having a cathode; and
   a second diode having an anode that is electrically connected to said cathode of said first diode and a cathode that is electrically connected to the electrically-operated hydraulic valve for lowering the snow plow blades;
   wherein said first vehicle headlight controller is connected to said cathode of said first diode and said anode of said second diode.

5. A headlight control system as defined in claim 2, additionally comprising:
   a device located between the plow controller and the electrical connection between the plow controller and the electrically-operated hydraulic valve for lowering the snow plow blade;
   wherein said device provides a ground connection to said plow controller when the electrical connection between the plow controller and the electrically-operated hydraulic valve for lowering the snow plow blade is connected to the voltage source, and wherein said device connects the voltage source to said plow controller when the electrical connection between the plow controller and the electrically-operated hydraulic valve for lowering the snow plow blade is not connected to the voltage source.

6. A headlight control system as defined in claim 1, wherein the first headlight on the snow plow is operated by a first light switch in the lighting system of the vehicle, and wherein the first light switch has an electrical connection to the first headlight on the snow plow, and wherein said first headlight power sensor comprises:
   an electrical connection between said first vehicle headlight controller and the electrical connection between the first light switch and the first headlight on the snow plow.

7. A headlight control system as defined in claim 6, additionally comprising:
   means for isolating said first vehicle headlight controller from the plow controller and the electrical connection between the first light switch and the first headlight on the snow plow.

8. A headlight control system as defined in claim 7, wherein said isolating means comprises:
   a diode having an anode connected to the electrical connection between the first light switch and the first headlight on the snow plow, said diode also having a cathode connected to said first vehicle headlight controller.

9. A headlight control system as defined in claim 1, wherein said first vehicle headlight controller comprises:
   a relay that has a solenoid coil connected between said blade position monitor and said first headlight power sensor, said relay, when said solenoid coil is energized, closing a switch to connect the first headlight of the vehicle to a source of electrical power.

10. A headlight control system as defined in claim 1, wherein the vehicle has a second headlight that is connected in parallel with the first headlight of the vehicle, and wherein the snow plow has a second headlight that is connected in parallel with the first headlight of the vehicle.

11. A headlight control system as defined in claim 1, wherein the first headlight of the vehicle and the first headlight of the snow plow are both low beam headlights, and wherein the vehicle additionally has a second headlight and the snow plow additionally has a second headlight, wherein the second headlight of the vehicle and the second headlight of the snow plow are high beam headlights, wherein said headlight control system additionally comprises:
   a second headlight power sensor which senses whether or not the second headlight of the snow plow is being provided with power by the lighting system of the vehicle to illuminate the second headlight of the snow plow; and
   a second vehicle headlight controller which automatically illuminates the second headlight of the vehicle when and only when the blade of the snow plow has been determined to be in a lowered position and electrical power is supplied to the second headlight of the snow plow by the lighting system of the vehicle to illuminate the second headlight of the snow plow.

12. A headlight control system as defined in claim 11, wherein said first vehicle headlight controller comprises:
   a first relay that has a first solenoid coil connected between said blade position monitor and said first headlight power sensor, said first relay, when said first solenoid coil is energized, closing a first switch to connect the first headlight of the vehicle to a source of electrical power; and
wherein said second vehicle headlight controller comprises:
   a second relay that has a second solenoid coil connected between said blade position monitor and said second headlight power sensor, said second relay, when said second solenoid coil is energized, closing a second switch to connect the second headlight of the vehicle to a source of electrical power.

13. A headlight control system for controlling a headlight of a vehicle having its lighting system connected to a headlight on a snow plow having a snow plow blade, the headlight of the vehicle being disconnected when the headlight of the snow plow is connected to be operated by the lighting system of the vehicle, said headlight control system comprising:
   a blade position monitor which determines when the snow plow blade is in a lowered position;
   a headlight sensor which senses whether or not the headlight of the snow plow is being provided with power by the lighting system of the vehicle; and
   a headlight controller which illuminates the headlight of the vehicle when the blade of the snow plow is in a lowered position and power is supplied to the headlight of the snow plow; the headlight controller including a first diode having an anode electrically connected to an electrically-operated hydraulic valve for lowering the snow plow blade, said first diode also having a cathode; and
   a second diode having an anode that is electrically connected to said cathode of said first diode and a cathode that is electrically connected to a plow controller configured to control the plow blade,
   wherein said headlight controller is connected to said cathode of said first diode and said anode of said second diode, isolating said headlight controller from the plow controller and the electrically-operated hydraulic valve for lowering the snow plow blade.

14. A headlight control system for controlling the headlights of a vehicle having its lighting system connected to corresponding headlights on a snow plow having a snow plow blade, the headlights of the vehicle being disconnected when the headlights of the snow plow are connected to be operated by the lighting system of the vehicle, said headlight control system comprising:
   a headlight controller which illuminates the headlights of the vehicle when the blade of the snow plow is in a lowered position and power is supplied to corresponding headlights of the snow plow.

\* \* \* \* \*